United States Patent [19]

Hart

[11] Patent Number: 4,811,337

[45] Date of Patent: Mar. 7, 1989

[54] DISTRIBUTED LOAD SHARING

[75] Inventor: John H. Hart, Campbell, Calif.

[73] Assignee: Vitalink Communications Corporation, Fremont, Calif.

[21] Appl. No.: 145,443

[22] Filed: Jan. 15, 1988

[51] Int. Cl.[4] .................. H04J 3/02; H01H 67/00
[52] U.S. Cl. .................. 370/85; 340/825.02
[58] Field of Search .................. 370/85, 60, 94, 58, 370/89, 86, 88, 93; 340/825.5, 827, 825.02

[56] References Cited

U.S. PATENT DOCUMENTS

| | | | |
|---|---|---|---|
| 4,347,498 | 8/1982 | Lee et al. | 370/94 |
| 4,399,531 | 8/1983 | Grande et al. | 340/825.02 |
| 4,627,052 | 12/1986 | Hoare et al. | 370/85 |

Primary Examiner—Robert L. Griffin
Assistant Examiner—Frank M. Scutch, III
Attorney, Agent, or Firm—Donald C. Feix

[57] ABSTRACT

Methods and apparatus for exchanging frames between bridges distribute load sharing in a communications network. The communications network is of the kind in which bridges, and related stations and local LANS, e.g. Ethernet LANs and 802 LANs, can be linked by paths in a plurality of sub-networks and wherein the bridges are linked to support a Spanning Tree Protocol (STP) which elects one bridge as a root and then with respect to said root, computes and utilizes one and only one loop-free set of primary paths between all bridges. Remaining paths, i.e. paths other than said STP primary paths, between the bridges are examined as possible sub-network paths for a Distributed Load Sharing (DLS) configuration in which frames exchanged between certain stations can utilize more than the STP one set of primary paths. Certain ones of the remaining paths are selected as DLS paths under certain conditions and frame are routed over a selected DLS path only when those frames meet certain criteria.

20 Claims, 21 Drawing Sheets

FRAME EXCHANGES IMPACTED BY DLS IN AN EXPANDED CONFIGURATION

FRAME EXCHANGES NOT IMPACTED BY DLS IN AN EXPANDED CONFIGURATION

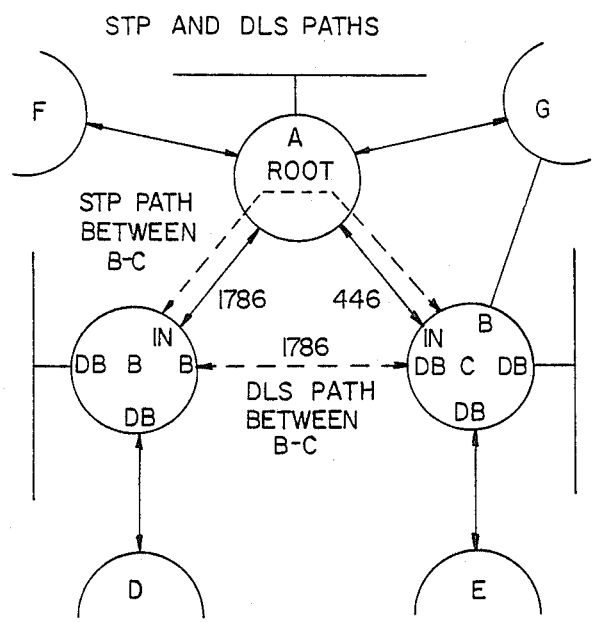
FIG. 3-1
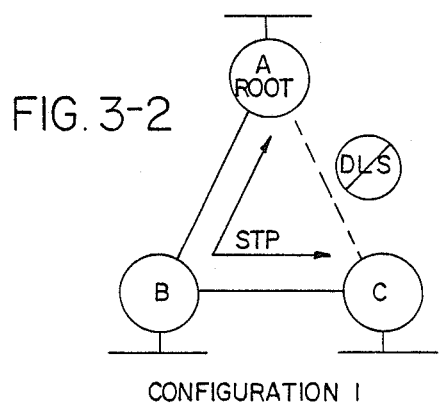
FIG. 3-2
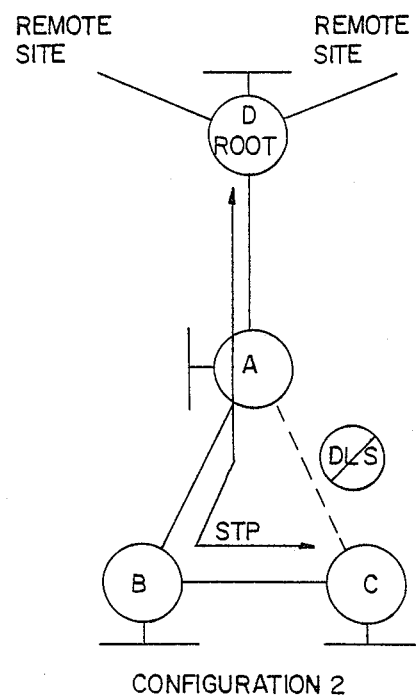

FRAME EXCHANGES IMPACTED BY DLS IN
A TANDEM DLS CONFIGURATION

DLS ENDPOINT EXTENSION ACROSS ETHERNET

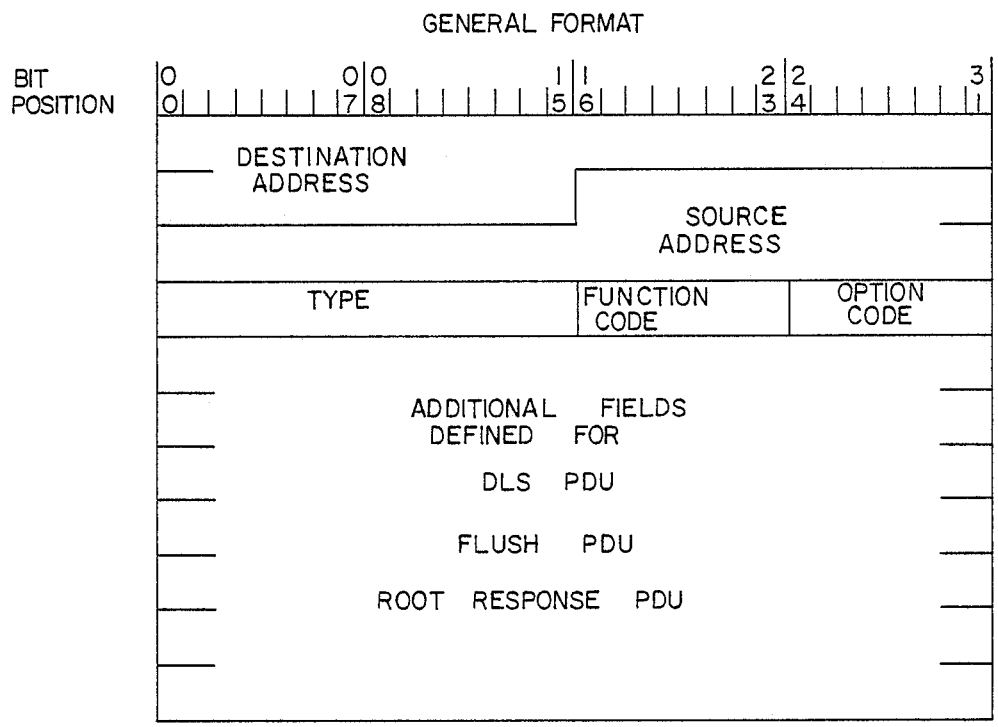
FIG.4 DLS PROTOCOL DATA UNITS (PDU)

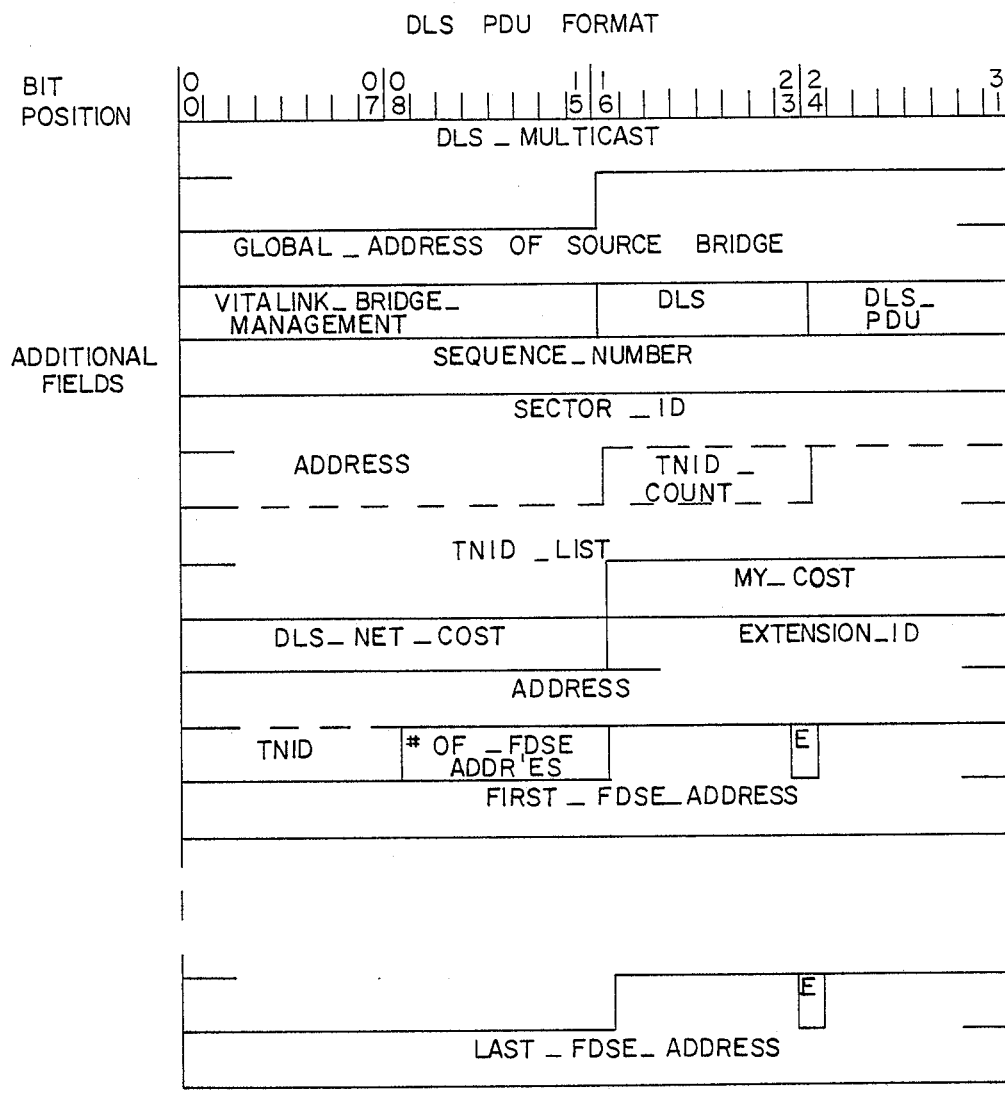
FIG. 4.1A DLS PROTOCOL DATA UNIT

SEQUENCE_NUMBER
    CONTAINS A VALUE FROM 1-0xFFFFFFFF

SECTOR_ID
    CONTAINS THE FOLLOWING FIELDS
    ADDRESS=ROOT ADDRESS
    TNID_COUNT=NUMBER OF TNID_LIST ENTRIES (1-7)
    TNID_LIST=A STRING OF 1 OCTET TRANSMIT NETWORK ID (TNID)
              VALUES DEFINING THE PATH FROM THE ROOT. THE FIRST
              OCTET CONTAINS THE ROOT TNID,THE SECOND OCTET THE
              SECOND BRIDGE TNID,ETC.
MY_COST
    EQUALS THE MY COST VALUE IN THE BRIDGE GENERATING THE DLS PDU

DLS_NET_COST
    EQUALS THE NET_COST OF THE DLS PATH BETWEEN THE RECEIVING
    BRIDGE AND THE BRIDGE THAT GENERATED THE DLS PDU(e.g.,FOR
    TANDEM NETWORKS EQUALS THE SUM OF THE NET_COSTS OF EACH
    NETWORK ALONG THE DLS PATH).

EXTENSION_ID
    CONTAINS EITHER ZERO OR THE FOLLOWING FIELDS
    ADDRESS=ADDRESS OF THE BRIDGE INTERFACING TO THE EXTENDED
            DLS NETWORK
    TNID =TNID OF THE EXTENDED DLS NETWORK

NUMBER_OF_FDSE_ADDRESSES
    EQUALS THE NUMBER OF FDSE GLOBAL ADDRESSES IN THE DLS
    PDU. THE MAXIMUM NUMBER OF FDSE GLOBAL ADDRESSES A
    DLS PDU WILL CONTAIN IS EQUAL TO 216 (ASSUMING 8000 FDSE's
    AND AN 8 SECOND DLS_INTERVAL). SINCE 236 IS THE MAXIMUM
    NUMBER OF GLOBAL ADDRESSES THAT CAN BE CARRIED IN A 1518
    OCTET DLS PDU,MULTIPLE PDU's WILL NEVER HAVE TO BE GENERATED
    DURING A DLS INTERVAL. IT SHOULD BE NOTED THAT DLS_INTERVALS WILL
    NORMALLY EQUAL 4 SECONDS AND IF A BRIDGE HAS 8000 FDES's ,108
    IS THE MAXIMUM. VALUE;IF THE BRIDGE HAS 1000 FDES's,14 IS THE
    MAXIMUM. VALUE,ETC... HOWEVER,NORMALLY,A DLS PDU WILL
    CONTAIN FAR FEWER THAN THE MAXIMUM . FDSE GLOBAL
    ADDRESSES WITH ZERO BEING QUITE COMMON.

Nth_FDSE_ADRRESS
    CONTAINS A SINGLE DESTINATION GLOBAL ADDRESS WHICH CAN BE
    SAFELY SWITCHED FROM THE STP PATH TO THE DLS PATH. SINCE A
    SINGLE DESTINATION ADDRESS ALWAYS CONTAINS 0 IN THE MULTICAST
    /BROADCAST BIT,THIS BIT CAN BE SAFELY USED AS A FLAG AS DEFINED
    BELOW

EMPTY FLAG (BIT 7 FOR 802.3)
    0=FDSE GLOBAL ADDRESS CONTAINS A SINGLE DESTINATION
      GLOBAL ADDRESS
    1=FDSE GLOBAL ADRRESS IS EMPTY (i.e.,DOES NOT CONTAIN A
      SINGLE DESTINATION GLOBAL ADDRESS

FIG. 4.1B

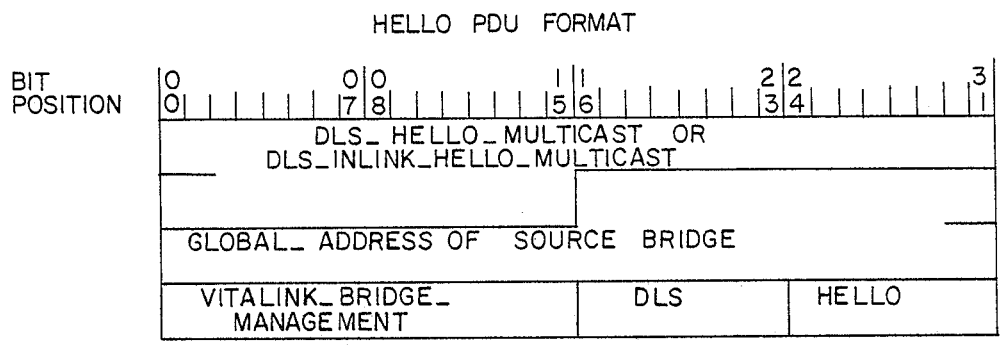
FIG. 4.2 HELLO PROTOCOL DATA UNIT
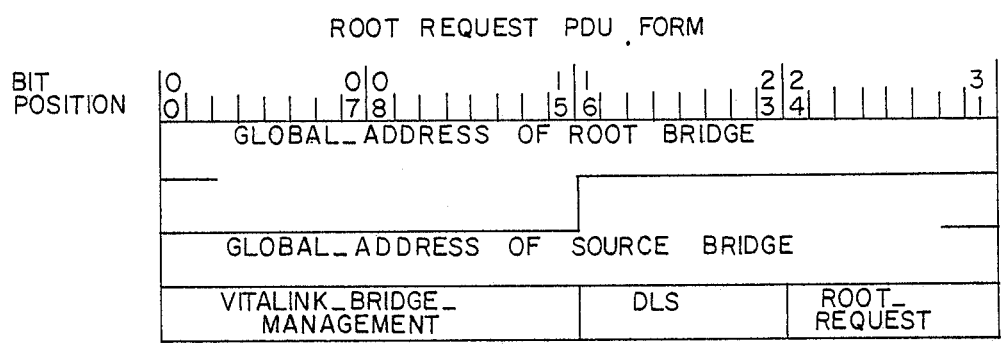
FIG. 4.4
ROOT REQUEST PROTOCOL DATA UNIT

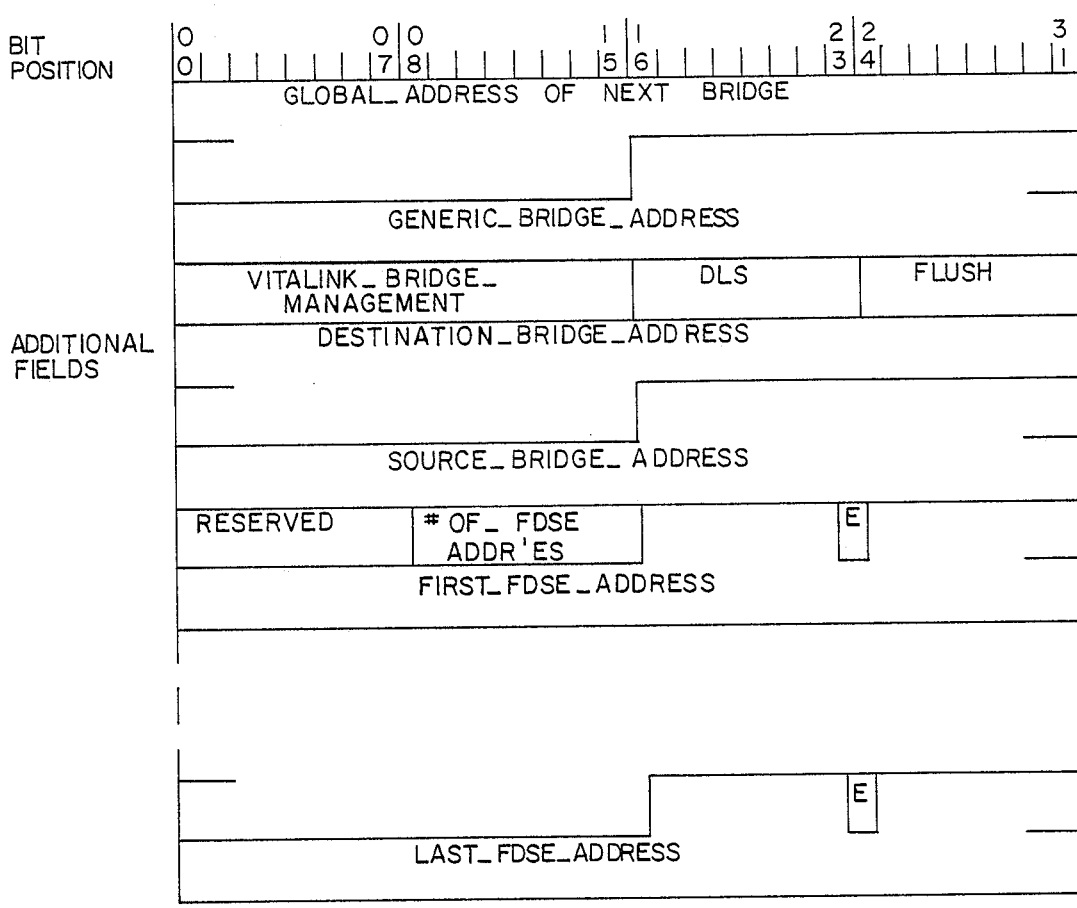
FIG. 4.3A

DESTINATION_BRIDGE_ADDRESS
   EQUALS THE GLOBAL ADDRESS OF THE DLS BRIDGE TO WHICH THIS
   FLUSH PDU IS BEING SENT.. DEPENDING UPON THE CONFIGURATION THIS
   FIELD MAY NOT EQUAL THE DESTINATION_ADDRESS.

SOURCE_BRIDGE_ADDRESS
   EQUALS THE GENERIC BRIDGE ADDRESS VALUE

RESERVED
   EQUALS ZERO.

NUMBER_OF_FDSE_ADDRESSES
   EQUALS THE NUMBER OF FDSE GLOBAL ADDRESSES IN THE FLUSH
   PDU. NEVER EQUALS ZERO.

Nth_FDSE_ADDRESS
   IDENTIFIES A SINGLE DESTINATION GLOBAL ADDRESS FDSE WHICH IS IN
   THE PROCESS OF MOVING FROM A STP TO A DLS PATH OR AGING
   OFF OF A DLS PATH. THE EMPTY FLAG IS DEFINED THE SAME AS FOR THE
   DLS PDU ABOVE.

FIG. 4.3B

FIG. 4.5
ROOT RESPONSE PROTOCOL DATA UNIT

ROOT RESPONSE PDU FORMAT

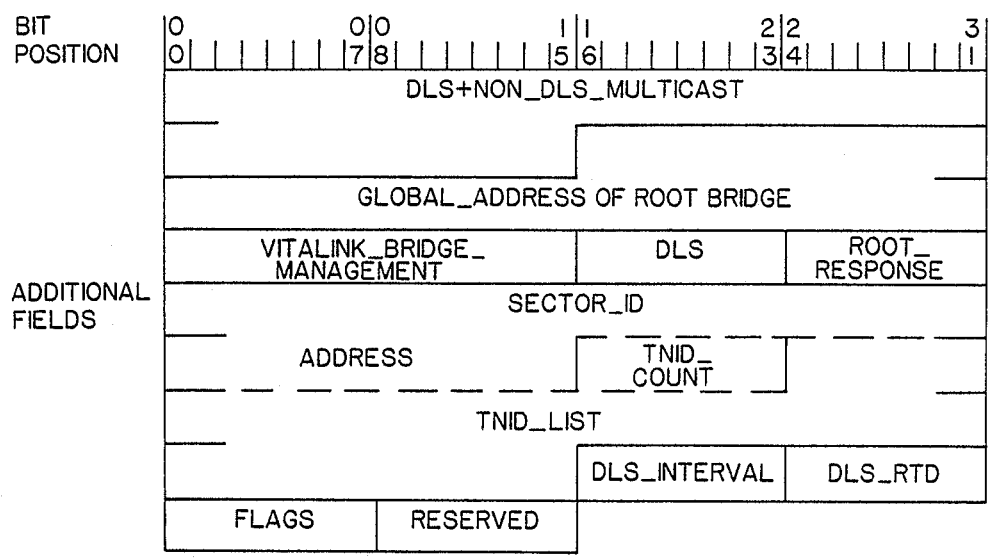

SECTOR_ID
  CONTAINS THE FOLLOWING FIELDS
  ADDRESS=ROOT ADDRESS
  TNID_COUNT=NUMBER OF TNID_LIST ENTRIES (1-7)
  TNID_LIST=A STRING OF 1 OCTET TRANSMIT NETWORK ID (TNID)
            VALUES DEFINING THE PATH FROM THE ROOT. THE FIRST
            OCTET CONTAINS THE ROOT TNID, THE SECOND OCTET THE
            SECOND BRIDGE TNID, ETC.

DLS_INTERVAL
  EQUALS THE CONFIGURED DLS_INTERVAL IN THE ROOT BRIDGE.

DLS_ROUND_TRIP_DELAY (RTD)
  EQUALS THE CONFIGURED DLS_RTD IN THE ROOT BRIDGE.

FLAGS
  CONTAINS THE FOLLOWING FLAGS
  FIFO_REQUIRED =TRUE/FALSE
  TRANSMIT_FLUSH_PDU=TRUE/FALSE

RESERVED
  EQUALS ZERO

FIG. 5 DLS DATA STORES

THE FOLLOWING DATA STORE CHANGES/ADDITIONS ARE REQUIRED BY DLS.

FIG. 5.1 GENERAL DLS (GDLS) VARIABLES

GLOBAL GDLS VARIABLES

| VARIABLE NAME | POSSIBLE VALUES, DEFAULT | REC |
|---|---|---|
| CONFIG_DLS_ROUND_TRIP_DELAY | 4-32 (SECONDS), 4 | YES |
| DLS_ROUND_TRIP_DELAY (RTD) | ROOT'S CONFIG_DLS_RTD, CONFIG_DLS_RTD | D |
| CONFIG_DLS_INTERVAL | 2-8 SECONDS, 4 | YES |
| DLS_INTERVAL | ROOT'S CONFIG_DLS_INTERVAL, CONFIG_DLS_INTERVAL | D |
| CONFIG_SECTOR_ID | (ROOT ADDRESS, TNID_COUNT, TNID_LIST), 0 | YES |
| SECTOR_ID | ROOT'S SECTOR_ID, CONFIG_SECTOR_ID | D |
| CONFIG_FIFO_REQUIRED | TRUE/FALSE, TRUE | YES |
| FIFO_REQUIRED | ROOT'S FIFO_REQUIRED, CONFIG_FIFO_REQUIRED | YES |
| CONFIG_TRANSMIT_FLUSH_PDU | TRUE/FALSE, TRUE | YES |
| TRANSMIT_FLUSH_PDU | ROOT'S TRANSMIT_FLUSH_PDU, CONFIG_TRANSMIT_F... | YES |

LOCAL GDLS VARIABLES

| VARIABLE NAME | POSSIBLE VALUES, DEFAULT | REC |
|---|---|---|
| DLS_NET_COUNT | 0-8, 0 | X |
| NEXT_DLS_BRIDGE | BRIDGE GLOBAL_ADDRESS, STP ROOT ADDRESS | NO |
| NEXT_DLS_BRIDGE_DISCARD_TIME | CURRENT_TIME+5 (DLS_INTERVAL), 0 | NO |
| NEXT_DLS_INTERVAL | CURRENT_TIME+N (DLS_INTERVAL)-1 TIC, 0 | X |
| SHORT_TIMERS_INVOKED | 0-65535, 0 | X |
| DLS_ROUND_TRIP_DELAY_EXPIRED | 0-65535 | NO |
| GENERATE_DLS_PDU | TRUE/FALSE, FALSE | S |
| DLS_MULTICAST | DLS_MULTICAST, 0x09002C... | S |
| DLS_HELLO_MULTICAST | DLS_HELLO_MULTICAST, 0x09002C... | S |
| DLS_INLINK_HELLO_MULTICAST | DLS_INLINK_HELLO_MULTICAST, 0x09002C... | S |
| DLS±NON_DLS_MULTICAST | DLS±NON_DLS_MULTICAST, 0x09002C... | S |
| ROOT_RESPONSE_RETRANSMIT_COUNT | 0-4, 0 | NO |
| INLINK_HELLOTIMER_STARTED | TRUE/FALSE, FALSE | NO |
| SEG_NUMBER | 0-0xFFFFFFFF, 0 | NO |

FIG. 5.2 TDSE VARIABLES

| VARIABLE NAME | POSSIBLE VALUES, DEFAULT | REC |
|---|---|---|
| STATE | .../DLS FORWARDING/DLS BACKUP/... | D |

FIG. 5.3 TDSE VARIABLES

| VARIABLE NAME | POSSIBLE VALUES, DEFAULT | REC |
|---|---|---|
| ENABLE_DLS | TRUE/FALSE, TRUE | S |
| FORCE_DLS | TRUE/FALSE, TRUE | S |
| GENERATE_DLS_PDU | TRUE/FALSE, FALSE | NO |
| FDSE_TOTAL | 0-65535, 0 | X |
| FDSE_MAXIMUM | 0-65535, TDSE NET_SPEED 1000 | S |
| FIRST_BLE | POINTER TO BLE WITH LOWEST NET_COST, 0 | NO |
| LAST_BLE | POINTER TO BLE WITH HIGHEST NET_COST, 0 | NO |
| BLE_COUNT | 0-4, 0 | D |
| UNUSED_BLE_ID_LIST | 1/0,2/0,3/0,4/0 | NO |
| FLUSH_PDU | POINTER TO FLUSH PDU BUFFER/() 0 | NO |
| NEXT_FLUSH_ADDRESS | POINTER TO NEXT FDSE ADDRESS FIELD IN FLUSH PDU/0 | NO |

FIG. 5.4 BRIDGE LIST ENTRY (BLE) VARIABLES

| VARIABLE NAME | POSSIBLE VALUES, DEFAULT | REC |
|---|---|---|
| BLE_ID | 1-4 | NO |
| ADDRESS | ASSOCIATED DLS BRIDGE GLOBAL ADDRESS | NO |
| SECTOR_ID | ASSOCIATED DLS BRIDGE SECTOR_ID | NO |
| NET_COST | ASSOCIATED DLS NETWORK(S) NET_COST | NO |
| MY_COST | ASSOCIATED DLS BRIDGE MY_COST | NO |
| EXTENSION_ID | (BRIDGE GLOBAL_ADDRESS TNID OF EXT NET)/0 | NO |
| DISCARD_TIME | CURRENT TIME 5(GDLS DLS_INTERVAL) | NO |
| NEXT_BLE | POINTER TO NEXT BLE POINTER/0 | NO |

| EVENTS \ STATES | PRE-FORW'G (1) | FORW,G (2) | FORW,G BACKUP (3) | DLS FORW'G (4) | DLS BACKUP (5) | OTHER (6) |
|---|---|---|---|---|---|---|
| HELLO STP PDU CHANGES SECTION 6.2.X | | −/5 X=1 | | | | |
| NV TIMER ALARM NEW ROOT CHANGES SECTION 6.2.X | | | | 2 X=2 | 3 X=2 | |
| FMP EACH 2 SEC PROCESSING CHANGES SECTION 6.3.X | | | | − X=1 | − X=1 | |
| FMP EACH TIC PROCESSING CHANGES SECTION 6.4.X | | | | − X=1 | − X=1 | |
| DLS HELLO PDU PROCESSING SECTION 6.5.X | IGNORED | − X=1 | IGNORED | IGNORED | IGNORED | IGNORED |
| DLS PDU PROCESSING SECTION 6.6.X | IGNORED | −/4 X=1 | IGNORED | − X=1 | − X=1 | IGNORED |
| FLUSH PDU PROCESSING SECTION 6.7.X | IGNORED | − X=1 | IGNORED | − X=1 | − X=1 | IGNORED |
| ROOT REQUEST PDU PROCESSING SECTION 6.8.X | IGNORED | − X=1 | IGNORED | IGNORED | IGNORED | IGNORED |
| ROOT RESPONSE PDU PROCESSING SECTION 6.9.X | IGNORED | − X=1 | IGNORED | IGNORED | IGNORED | IGNORED |
| INLINK HELLO TIMER ALARM SECTION 6.10.X | | − X=1 | | | | |
| STP SECTION 3.3.1.7 PROCESSING CALL SECTION 6.1.X THEN EXECUTE 3.3.1.7 | − X=3 | − X=3 | − X=3 | 2 X=3 | 3 X=3 | − X=3 |
| STP SECTION 3.3.1.8 PROCESSING CALL SECTION 6.1.X THEN EXECUTE 3.3.1.8 | − X=3 | − X=3 | − X=3 | 2 X=3 | 3 X=3 | − X=3 |
| STP SECTION 3.3.1.9 PROCESSING CALL SECTION 6.1.X THEN EXECUTE 3.3.1.9 | − X=3 | − X=3 | − X=3 | 2 X=3 | 3 X=3 | − X=3 |

IN THE ABOVE MATRIX, A BLANK RECTANGLE MEANS THAT THERE ARE NO RELEVANT CHANGES AND/OR ACTIONS ASSOCIATED WITH THE EVENT/STATE OPERATION.

FIG. 6
DLS OPERATION

FIG. 6.5

DLS HELLO PDU PROCESSING

| | n | y | y |
|---|---|---|---|
| HELLO'S SOURCE_NID TDSE TNID=XDS INLINK | n | y | y |
| GDLS INLINK HELLO_TIMER_STARTED=TRUE | | y | n |
| SET GDLS NEXT DLS BRIDGE=HELLO SOURCE_ADDRESS | | x | x |
| SET GDLS NEXT DLS BRIDGE DISCARD_TIME = CURRENT_TIME+5(GDLS DLS_INTERVAL) | | x | x |
| SET GDLS INLINK HELLO TIMER_STARTED=TRUE | | | x |
| START INLINK HELLO TIMER ALARM, PERIOD = 1 SECOND | | | x |
| DISCARD DLS HELLO PDU | x | x | x |

DISTRIBUTED LOAD SHARING

BACKGROUND OF THE INVENTION

This invention relates to methods and apparatus for exchanging frames between bridges to distribute load sharing in a communications network of the kind in which bridges, and related stations and local LANs, e.g. Ethernet LANs and 802 LANs, can be linked by paths in a plurality of sub-networks and wherein the bridges are linked to support a Spanning Tree Protocol (STP) which elects one bridge as a root and then, with respect to said root, computes and utilizes one and only one loop-free set of primary paths between all bridges.

This invention relates particularly to methods and apparatus for examining remaining paths, i.e. paths other than said STP primary paths, between the bridges as possible sub-network paths for a Distributed Load Sharing (DLS) configuration in which frames exchanged between certain stations can utilize more than said STP one set of primary paths between the stations. Certain ones of the remaining paths as are then selected as DLS paths only when certain conditions are met and frames are routed over a selected DLS path only those frames meet certain criteria.

The following document is incorporated by reference in this present application. U.S. Pat. No. 4,706,081 entitled "Method and Apparatus for Bridging Local Area Networks" issued Nov. 10, 1987 to Hart, et al., and assigned to Vitalink Communications Corporation.

The trademark "TransLAN" is registered in the U.S. Patent and Trademark Office and is owned by Vitalink Communications Corporation. This TransLAN trademark is used by Vitalink Communications Corporation on hardward and software for the configurations and methods of the communications system disclosed in the above noted U.S. Pat. No. 4,706,081. The trademark TransLAN is used below in the present application in reference to such hardware and software for the configurations and methods of the communications system disclosed in U.S. Pat. No. 4,706,081.

The Spanning Tree Protocol (STP) computes primary paths between all bridges in a communications network of the kind in which the bridges, and related stations in local LANs, e.g. Ethernet LANs and 802 LANs, can be linked by paths in a plurality of sub-networks.

The spanning Tree Protocol (STP) elects one bridge as a root and then, with respect to said root, computes and utilizes one and only one loop-free set of primary paths between all the bridges.

Some of the remaining paths, i.e. paths other than said STP primary paths between the bridges can, in the STP protocol, be designated as backup paths under certain conditions; but the STP protocol transfers frames only on the primary paths, and not on any of the remaining paths, so long as the primary paths remain effective to function (until some event occurs which requires a re-configuration of the primary paths in the STP protocol).

It is a primary object of the present invention to distribute load sharing in a network in which bridges are linked to support STP by using paths additional to the primary paths for transferring frames between bridges.

It is a related object to distribute load sharing in a way which preserves loop-free paths between all bridges.

SUMMARY OF THE INVENTION

The methods and apparatus of the present invention exchange frames between bridges to distribute load sharing in a communication network of the kind in which bridges, and related stations in local LANs, e.g. Ethernet LANs and 802 LANs, can be linked by paths in a plurality of sub-networks and wherein the bridges are linked to support a Spanning Tree Protocol (STP) which elects one bridge as a root and then, with respect to said root computes and utilizes one and only one loop free set of primary paths between all bridges.

The present invention examines remaining paths, i.e. paths other than said STP primary paths, between the bridges as possible sub-network paths for a Distributed Load Sharing (DLS) configuration in which frames exchanged between certain stations can utilize more than said STP one set of primary paths between the stations.

The methods and apparatus of the present invention select certain ones of the remaining paths as DLS paths only when (a) the two bridges interfacing to the DLS path also interface to one or more other sub-networks and neither is the STP root bridge.

The present invention routes over a selected DLS path only those frames (a) which have a known single destination, and (b) which are frames to be transferred between stations (1) which are further away from the root than either bridge associated with said stations or (2) which lie on the bridge's local LAN.

The present invention configures the bridges at the ends of a DLS path to know which stations are farther away from said root so that frames are not transferred between stations whose source network is an STP inlink on either bridge unless the STP inlink on either bridge is the local LAN.

A DLS path end point extension feature (DLS Extension) allows support DLS paths by bridges with only two networks and also applies to bridges with more than two networks.

The DLS Extension feature of the present invention allows frames to be exchanged between stations located on inlinks of bridges interfacing to a DLS path. In addition the DLS Extions feature allows frame exchanges between stations located further away from the root than one or both bridges interfacing to a DLS path.

Station addresses are switched between an STP path and selected DLS paths while preserving first-in first-out (FIFO) frame exchange while switching the station addresses.

Self learning bridges on a potential DLS path are configured (a) to recognize when said bridges are on a potential DLS path, (b) to let the related bridge on the DLS path know of said recognition, (c) to decide whether the related bridge is on the DLS path, (D) to agree with the related bridge to form the DLS path, (e) to advertise to the related bridge which stations are appropriate to use the DLS path, (f) to flush the STP path with a flush packet prior to switching stations over to start using the DLS path to thereby preserve first-in first-out (FIFO) frame exchange between stations, then (g) to start switching stations over to using the DLS path.

Steps (f) and (g) above are performed in reverse prior to switching a DLS path over to an STP path.

The data stores for each of the sub-networks are configured for operation with STP and DLS paths.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 through FIG. 5 are views of communication networks having bridges linked by primary paths to support a Spanning Tree protocol (STP). The captions included in FIGS. 1-FIG. 5 summarize, in each respective figure, how the Distributed Load Sharing (DLS) feature of the present invention affects or allows frame exchange between the bridges along the primary paths provided by STP and along additional paths provided by DLS. The STP paths are indicated by the solid lines.

FIGS. 3-1 through FIG. 3-11 (like FIG. 1 through FIG. 5 above) show communications networks in which bridges are linked to support STP. The paths indicated by the solid arrows indicate the STP paths. FIG. 3-1 through FIG. 3-11 are used to illustrate a DLS overview. These figures illustrate how the present invention examines remaining paths, i.e. paths other than the STP primary paths, between the bridges as possible sub-network paths for the DLS configuration and illustrate how the present invention selects certain ones of the remaining paths as DLS paths only when certain conditions are met. These figures illustrate how frames are routed over the selected DLS paths only when the frames comply with certain criteria.

FIG. 4 through FIG. 4.5 show the format of the protocol data units of the different types of protocols required to communicate information in the DLS methods and apparatus of the present invention.

FIG. 5 through FIG. 5.4 relate to the data stores of the DLS methods and apparatus of the present invention and illustrate the data stored variables which are required and which have to be maintained by the distributed protocol of the DLS methods and apparatus of the present invention.

FIG. 6 is a chart showing the operation of the DLS methods and apparatus of the present invention. FIG. 6 shows the bridge port states in columns and the events in the rows, as labeled.

FIG. 6.5 shows details of the state changes which occur upon receipt of the event shown in the fifth row of FIG. 6 (the receipt of the event "DLS Hello PDU Processing"). The state changes associated with the other events listed in FIG. 6 are filled in very much the same fashion as the state changes illustrated in FIG. 6.5.

DETAILED DESCRIPTION OF THE PREFERRED EMBODIMENTS

Section 1—Overview

Bridges supporting the Spanning Tree Protocl (STP) collectively utilize one loop free set of paths between all Bridges. In contrast, topologies with loops present fewer problems to Routers. Routers, which do not learn from a frames source, are free to independently pick their set of paths (i.e. computer own spanning tree) and, as a result, can independently utilize alternate paths. This document defines TransLAN Distributed Loan Sharing (DLS) feature which provides an equivalent or greater level of flexibility for most configurations.

When a Network is labeled by STP as a Backup network, its role is that of a hot standby. Unless there is a network failure, its bandwidth is not available for exchange of frames between stations.

Figure 1:
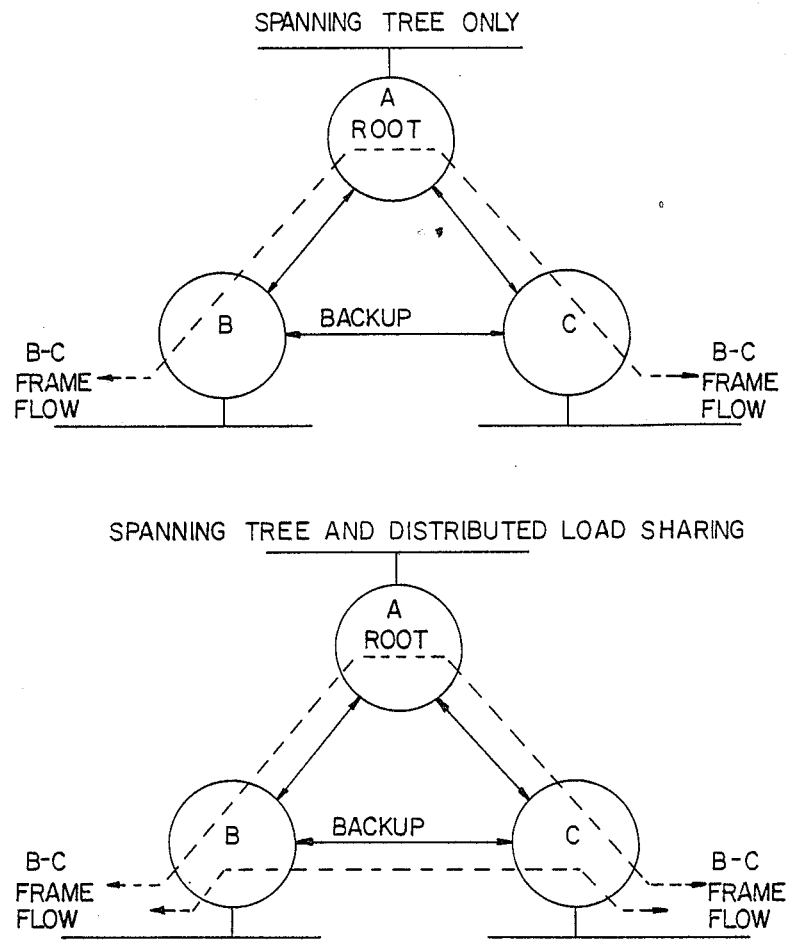

FIG. 1 illustrates that DLS removes this restriction by allowing frames exchanged between stations on Bridge B's Ethernet and stations on Bridge C's Ethernet to utilize more than one path. Instead of traveling only on the STP path across Network B-A and then Network A-C (termed path B-A-C), DLS allows the frames to also be forwarded across the STP Backup Network B-C, termed DLS path B-C. Furthermore, the DLS load sharing potential increases as the configuration expands.

Figure 2:
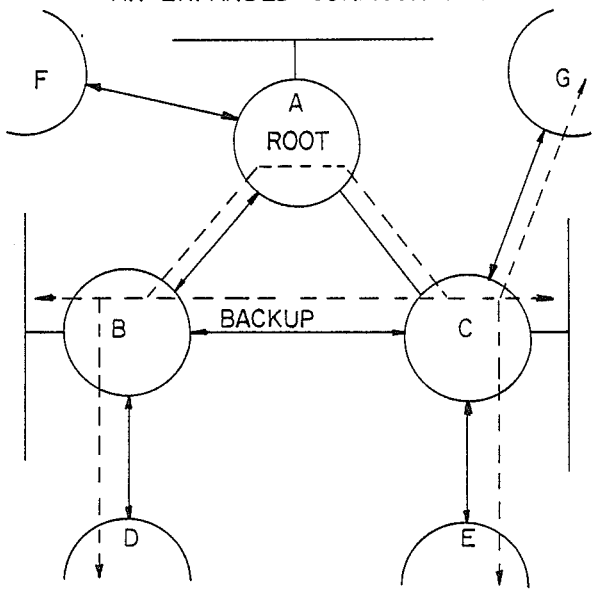

The FIG. 2 configuration shows that DLS allows the exchange of frames between Bridge B or D Ethernet stations and Bridge C, E, or G Ethernet stations to be load shared across STP path B-A-C and DLS path B-C. However, as illustrated in FIG. 3, frames exchanged between Bridge A and Bridge F Ethernet stations and any other Bridge Ethernet Stations (i.e. B, C, D, E, and G) use only STP paths.

Figure 3:
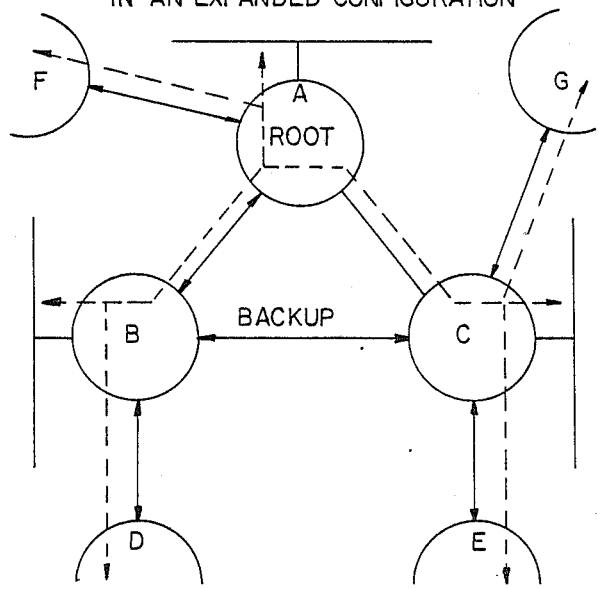
Figure 3:
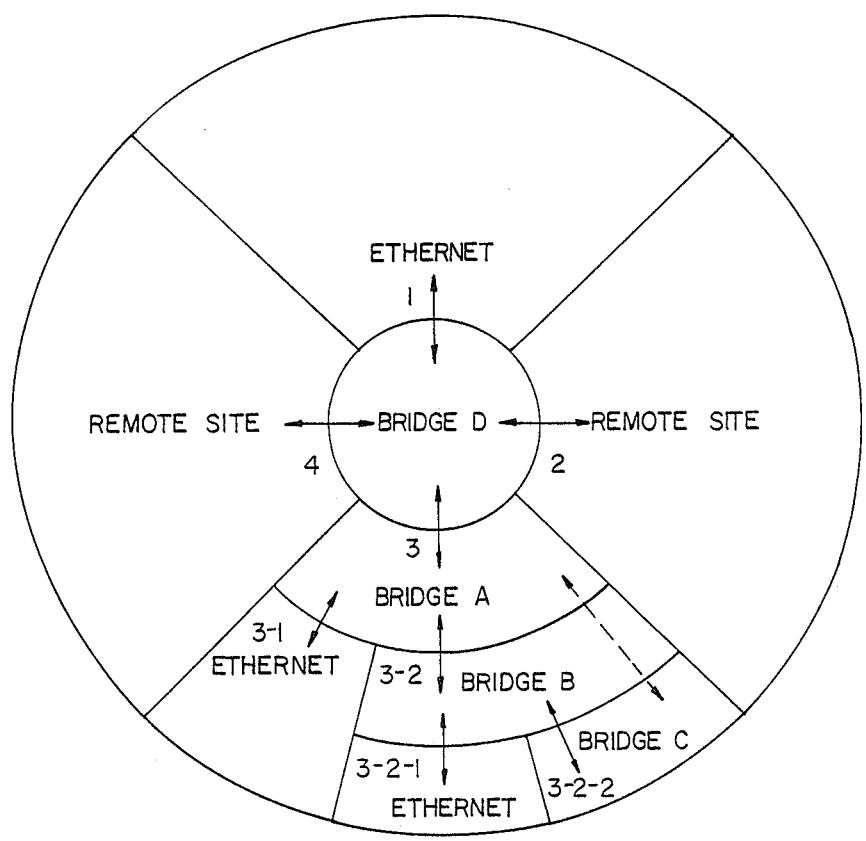

What the FIGS. 2 and 3 configurations point out is that load sharing across DLS path B-C impacts the exchange of frames between stations only when both of the following are true:

the STP path between the stations traverses both Bridge B and Bridge C (i.e. the Bridges interfacing to the Backup Network);

from an STP perspective one of the stations is positioned further away from Root than Bridge B and the other from Bridge C.

Another important DLS feature is that tandem DLS paths can be configured by concatenating shorter DLS paths together. To illustrate this feature, the above configuration is further expanded by adding a network between Bridge A and Bridge G. This results in STP labeling the new Network (Network G-A) as the Inlink for Bridge G and labeling Network G-C, the old Inlink, as a STP Backup Network. Backup Network G-C can now become a DLS path. After this occurs, tandem DLS path B-C-G can be established. The DLS frame exchanges in the resulting configuration are illustrated in FIG. 4.

Figures 3, 4:
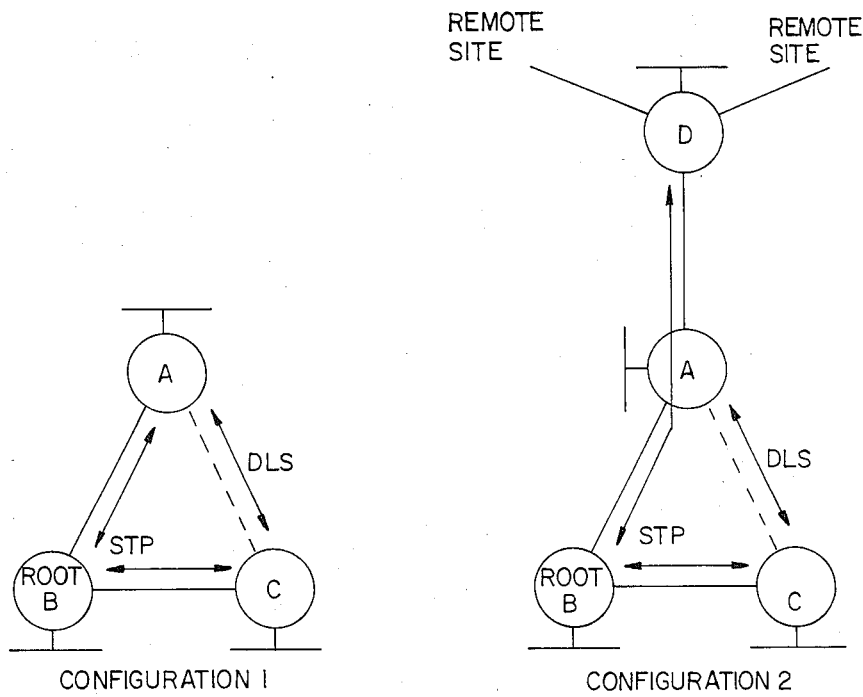

In FIG. 4, the exchange of frames between Bridge G Ethernet stations and both Bridge C and E Ethernet stations is load shared over path G-A-C and G-C (and then across C-E when exchanging frames with Bridge E Ethernet stations). Likewise, the exchange of frames between Bridge G Ethernet stations and both B and D Ethernet stations is load shared over path G-A-B and G-C-B (and then across B-D when exchanging frames with D Ethernet stations). The exchange of frames between Bridge B or D Ethernet stations and Bridge C or E Ethernet stations continues to be load shared over path B-A-C and B-C as described earlier.

In FIGS. 1-4, a bridge interfacing to a DLS path always contains more than two Networks and the stations that utilize the DLS path are located on networks that are further away from the Root than the bridge (i.e., the stations are not on the Inlink path to the STP root brigde). This characteristic would seem to preclude support of DLS paths by bridges with only two networks because, if one network is a DLS path, the other must be the Inlink path.

Consequently, the bridge sees all stations as closer to the Root.

The DLS path endpoint extension feature (termed DLS Extension) allows support DLS paths by bridges with only two networks.

Figures 3, 4, 5:
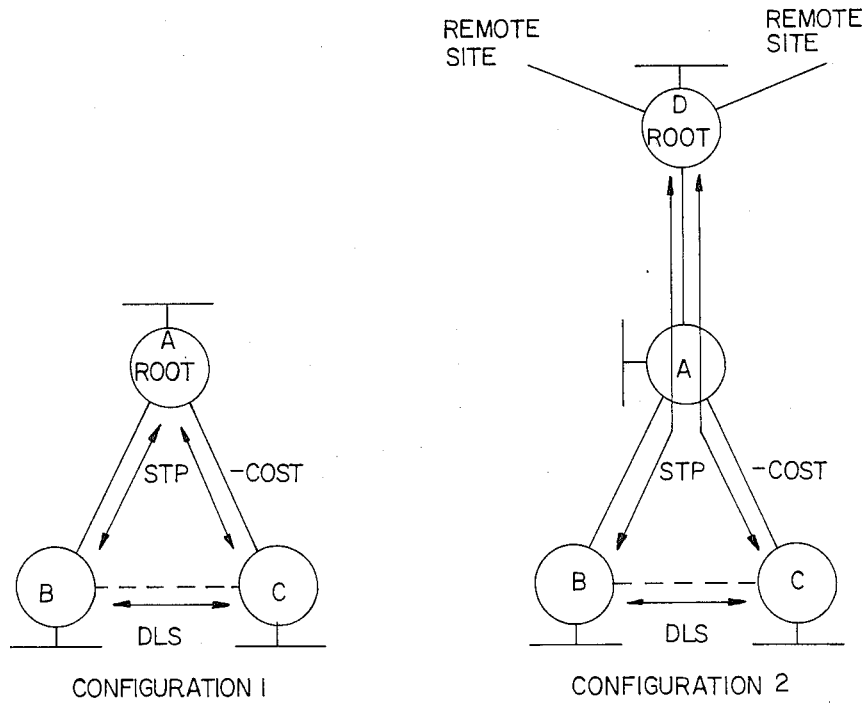
Figures 3, 4, 5, 6:
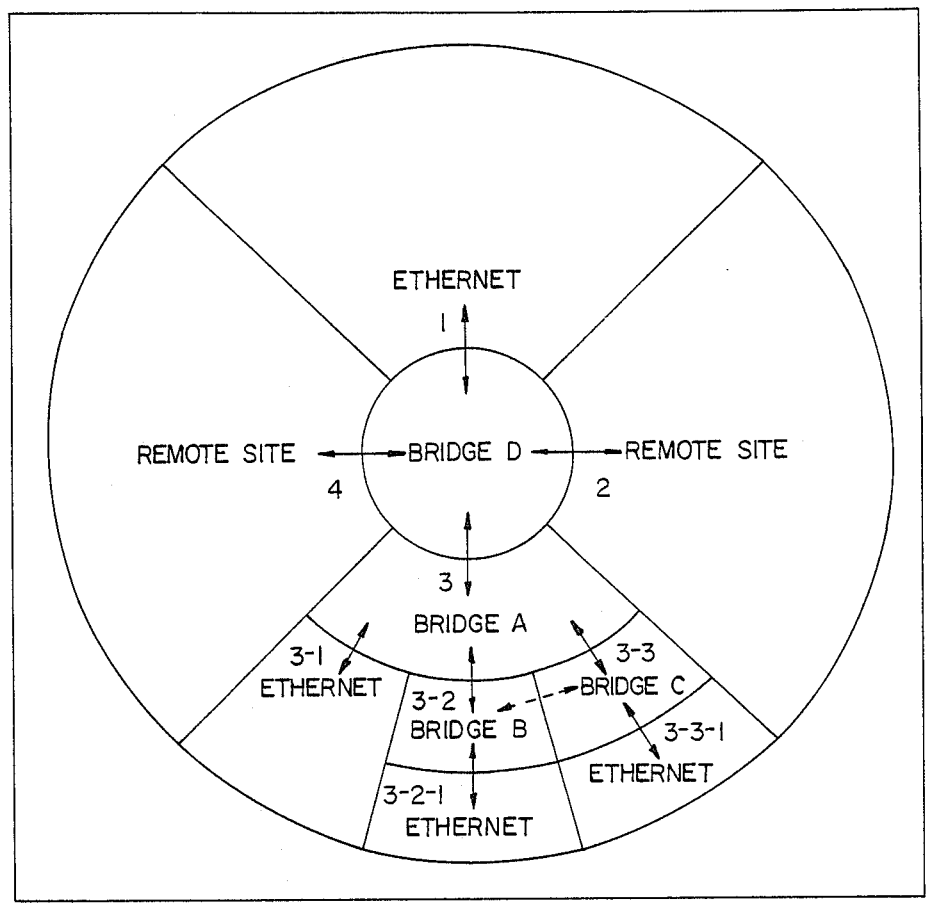
Figures 3, 4, 5, 6, 7:
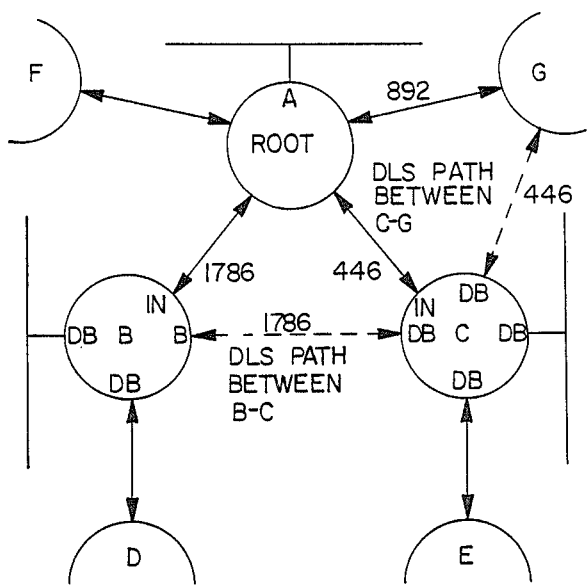
Figures 3, 4, 5, 6, 7, 8:
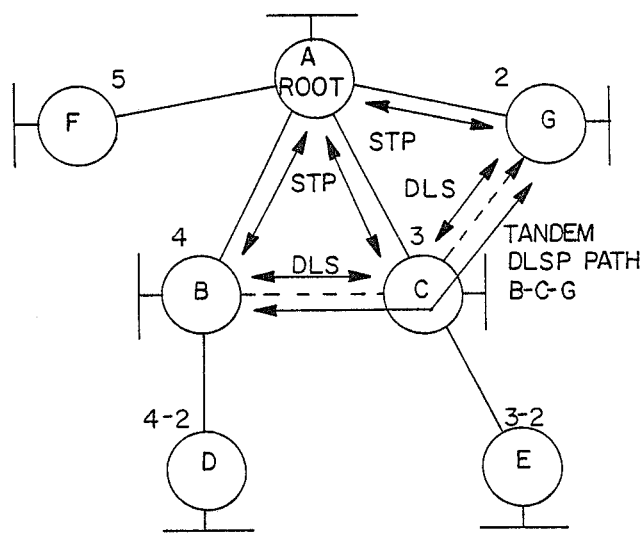
Figures 3, 4, 5, 6, 7, 8, 9:
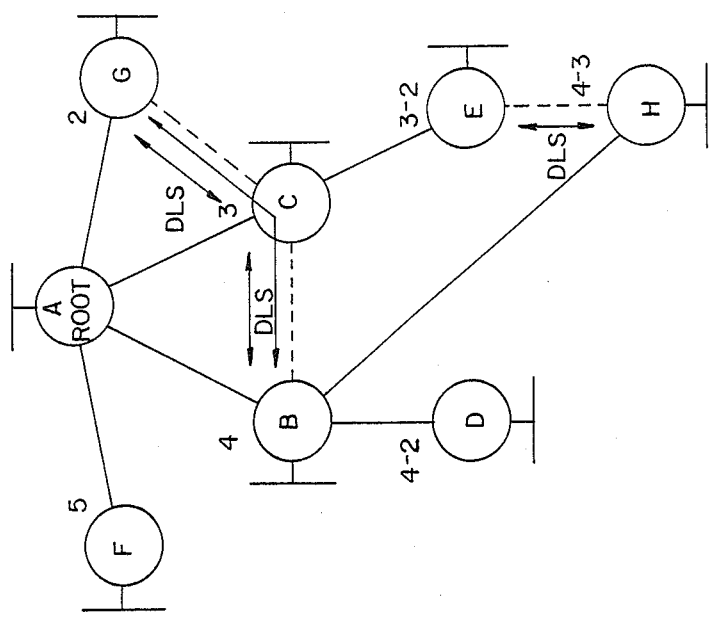
Figures 3, 4, 5, 6, 7, 8, 9, 10:
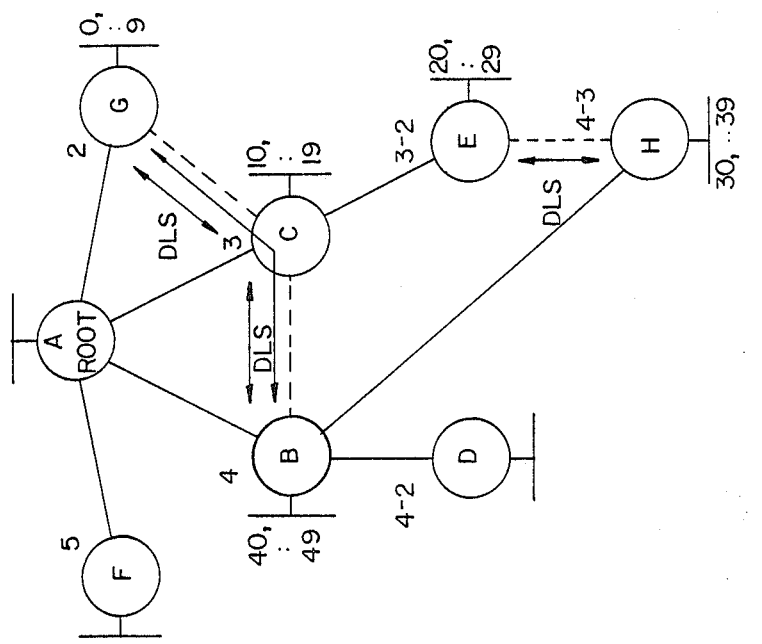
Figures 3, 4, 5, 6, 7, 8, 9, 10, 11:
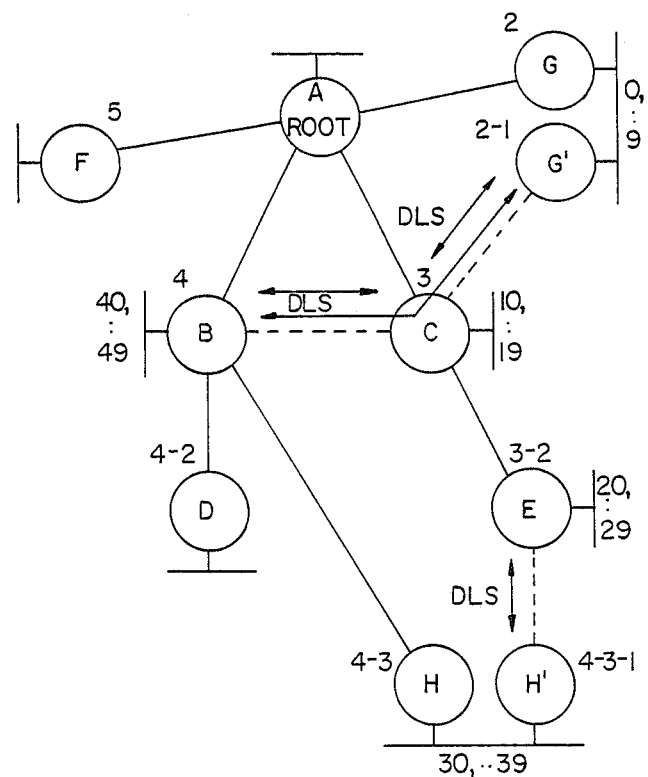
Figure 4:
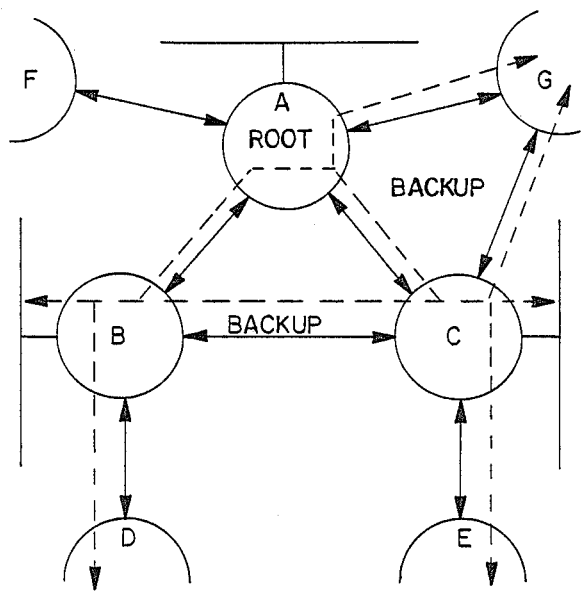
Figure 5:
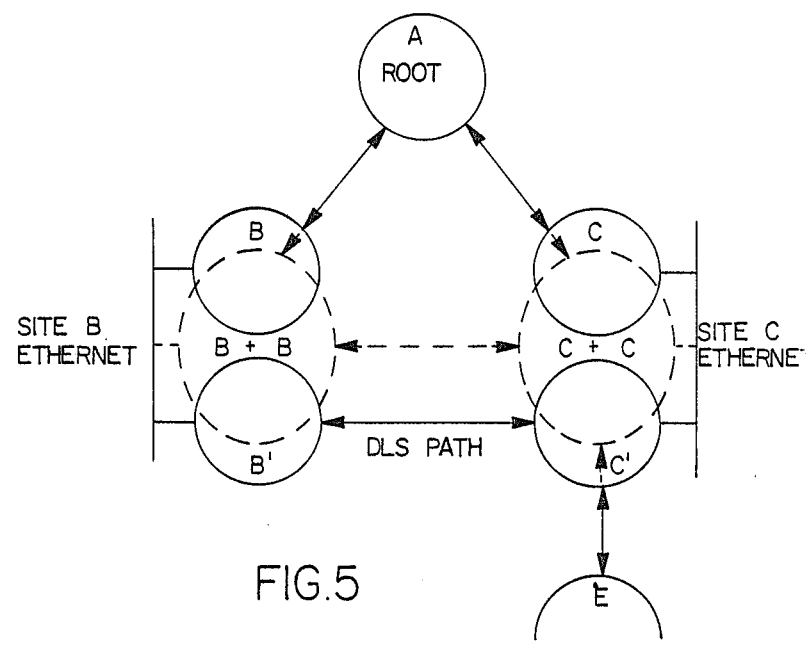

FIG. 5 illustrates that the DLS Extension feature involves the cooperation of the bridge interfacing directly to the DLS path and the Designated Bridge on its Ethernet Inlink. Together bridges B'+B and C'+C support DLS path B'-C'. DLS path B'-C' supports frame exchanges between stations on the Site B Ethernet and stations on the Site C Ethernet. Since Bridge C' has three networks, FIG. 5 illustrates that the DLS Extension feature also applies to bridges with more than two networks. In summary, the DLS Extension feature allows frames to be exchanged between stations located on the Ethernet Inlinks of the bridges interfacing to a DLS path. In addition, the DLS Extension feature allows frame exchanges between stations located further away from the Root from one or both bridges interfacing to a DLS path (e.g. DLS Extension allows frame exchanges between stations on the Site E Ethernet and stations on the Site B Ethernet).

Section 1.1—Feature List

The following list summarizes the TransLAN Release 6.9 DLS features.

1. Automatically utilize a network as a DLS path only when the two bridges interfacing to the DLS path also interface to two or more other networks and neither is the STP Root Bridge.
2. Provide an REC configuration capability to either prevent a DLS path from forming or restrict the number of stations allowed to utilize it. When the Backup Network has a higher cost than the STP path between the two bridges, the number of stations allowed to utilize the DLS path will always be restricted using this capability.
3. Route only the following frames over a DLS path:
    known single destination frames. Multicast and unknown single destination frames always use the STP route.
    frames to be transferred between staions (1) which are fruther away from the root than either bridge associated with said stations or (2) which lie on the bridge's local LAN.
4. Automatically learn the station addresses that utilize the DLS path.
5. Load share between the DLS and STP path.
6. Provide as an option the ability to preserve FIFO while switching station addresses between an STP path and DLS path and vice versa.
7. Support tandem DLS paths made up of one to four shorter DLS paths.
8. Support up to 4 DLS Extensions across a single Ethernet inlink. This includes tandem DLS paths and-/or DLS paths supported by multiple bridges with the same Ethernet inlink.

Section 2—External Reference Specification

This Section describes the changes and additions to the reconfiguration and view screens and the new Commands required for DLS support.

Section 2.1—Reconfiguration and View Screens

The following rec screens contain the new DLS Variables.

Section 2.1.1—TransLAN General DLS Variables

| /1/2/?/? | DLS GLOBAL VARIABLES | | | Bridge B |
|---|---|---|---|---|
| Variables | | | | Current Value |
| 1. Sector ID, Configured | Address | S | 0x000000000000 | |
| 2. | Count | S | 0 | |
| 3. | Tx Net | S | 0x00000000000000 | |
| 4. Sector ID, Utilized | Address | D | 0x08007C000065 | |
| 5. | Count | D | 1 | |
| 6. | Tx Net Path | D | 0x02000000000000 | |
| 7. DLS Round Trip Delay | Configured | S | 4 | |
| 8. | Utilized | D | 4 | |
| 9. DLS Interval | Configured | S | 4 | |
| 10. | Utilized | D | 4 | |
| 11. FIFO Required | Configured | S | True | |
| 12. | Utilized | D | True | |
| 13. Transmit Flush Frame | Configured | S | True | |
| 14. | Utilized | D | True | |

Global Variables

All DLS Global Variables have Configured and Utilized values. The values confirmed into a TransLAN Spanning Tree Root Bridge automatically become the utilized values in other TransLAN bridges. In configurations where a TransLAN bridge is not the root bridge (e.g. a LAN Bridge 100), the values can be configured into each TransLAN Bridge.

Sector ID (Configured and Utilized) contains the following values:

Address—Global Address of the Root Bridge
Count—the number of Networks to the Root Bridge (1-7). If there are more than seven, put 7.
Tx Net Path—the list of Transmit Network IDs from the Root to this Bridge. Each Transmit ID equals two hex digits (i.e. OxNN) in the list. If there are more seven Transmit IDs, put only the first seven.

DLS Round Trip Delay (Configured and Utilized)

Indicates in a Bridge with one or more DLS Networks, the worst case round trip delay through the spanning tree Root Bridge and then back across the DLS Network. The Configured DLS Round Trip Delay values can range from 4 to 32 seconds. The default value is 4. This default vaue is computed from the simple DLS configuration illustrated in FIG. 3-1. In this configuration the DLS round trip path for Bridge B goes from B to A to C and then back to B. Since the worst case delay within a Bridge is normally restricted to 1 second (i.e. the rec default configuration value), the default value of 4 was picked by adding 1 second for queuing in Bridge B, A, C and then adding 1 second for overall transmission/processing time. In configurations where the DLS round trip is longer, the Configured DLS Round Trip Delay value should be increased (see Round Trip Delay Expired Count below).

DLS Interval (Configured and Utilized)

Indicates in a Bridge with one or more DLS Networks, how often station addresses will be advertised for switching between the STP and the DLS Path. The Configured DLS Interval values can range from 4 to 32 seconds. The Default value is 4. This default value is a good choice for most configurations. An exception to this may occur in configurations with low bandwidth networks (e.g. 9.6 kbps). In these configuration, the Configured DLS Interval value can be increased in order to reduce DLS Protocol overhead.

FIFO Required (Configured and Utilized)

Indicates if address's source network can immediately be moved between the "old" STP and a "new" DLS path, or vice versa. If FIFO Required value is True.

Transmit Flush Frame (Configured and Utilized)

This variable is only meaningful when FIFO Required equals True (the default value) and defines the method for flushing the traffic associated with the "old" path. When Transmit Flush Frame is set to True, the "old" path is flushed by marking the address as "so not forward", transmitting a Flush frame, and setting a timer equal to the DLS Round Trip Delay value. Normally, an address's source network is changed to the "new" path and the "do not forward" removed when a Flush frame returns. If the Flush is lost, the source network is changed to the "new" path and the "do not forward" removed when the timer expires. The default Transmit Flush Frame value is True. Setting Transmit Flush Frame equal to false will normally lengthen the flush time but may be necessary in multivendor bridge environments.

Section 2.1.2—TransLAN Local DLS Variables

| /1/2/?/? | DLS LOCAL VARIABLES | | Bridge B |
|---|---|---|---|
| | Variables | | Current Value |
| 1. | DLS Multicast | S | 0x09007C... |
| 2. | DLS Hello Multicast | S | 0x09007C... |
| 3. | DLS Inlink Hello Multicast | S | 0x09007C... |
| 4. | DLS and Non-DLS Multicast | S | 0x09007C... |
| 5. | DLS Networks | X | 1 |
| 6. | Short Timers Invoked | X | 9 |
| 7. | Round Trip Delay Expired Count | X | 0 |

Local Variables

DLS Local variables are not changed by the values configured in the Spanning Tree Root brigde.
DLS Multicast
DLS Hello Multicast
DLS Inlink Hello Multicast
DLS and Non DLS Multicast Indicates three Multicast Address values used by DLS.

DLS Networks

Indicates the number of DLS Networks in a Bridge.

Round Trip Delay Expired Count

Indicates in a Bridge with one or more DLS Networks, that either certain DLS Protocol Frames are being discarded during their round trip journey or the DLS Round Trip Delay value is too small. If a network in the round trip path has failed, Spanning Tree and/or Network Validation protocols will detect this failure and the value will stop increasing. Otherwise, if this is not the case, the DLS Round Trip Delay value (in the TransLAN Root) should be increased.

Section 2.1.3—Transmit Data Store Configurable Variables

| /1/2/2/1/? | TRANSMIT DATA STORE CONFIGURABLE VARIABLES | | Network B-C |
|---|---|---|---|
| | Variables | | Current Value |
| 1. | Name | | Network B-C |
| 2. | Current State | D | DLS Backup |
| 3. | Initial State | S | On |
| 4. | If Broken, Why | D | CTS loss |
| 5. | Network Topology | | non rooted |
| 6. | Link Type | | terrestrial |

Current State

Indicates the Transmit Network State. The new Current State values are

DLS Backup: The Distributed Load Sharing logic sets Current State equal to DLS Backup if the Spanning Tree protocol logic determines that the value of Current State is equal to Backup, Enable DLS equals True (defined below), Parallel Network and/or Network Validation equals True and
  1. The Network cost of this network is less than the Spanning Tree cost of the path to the remote bridge on the network.
  2. Force DLS=True (defined below).
  3. The remote Bridges agrees that the network is a DLS path.

DLS Forwarding: The Distributed Load Sharing logic sets Current State equal to DLS Forwarding if the Spanning Tree protocol logic determines the value of Current State is equal to Forwarding, Enable DLS equals True (defined below), Parallel Network and/or Network Validation equals True, and the remote Bridge agrees that the network is a DLS path.

Section 2.1.4—DLS Transmit Network Variables

| /1/2/?/? | Distributed Load Sharing Variables | | Network B-C |
|---|---|---|---|
| | Variables | | Current Value |
| 1. | Enable DLS | S | True |
| 2. | Force DLS | S | True |
| 3. | FDSE Total | X | 3 1 |
| 4. | FDSE Maximum | | 5 6 |

Enable DLS

If set to True for a point to point network, indicates that the Transmit Network Current State can be set to DLS Backup or DLS Forwarding as defined above. If set to True for the Ethernet, indicates DLS Extensions can occur. If set to False, indicates that neither DLS paths or DLS Extensions are supported across this network. The Default value equals False.

Force DLS

If set to False, indicates that Transmit Network Current State will only be set to DLS Backup when the Network cost of the Network is less than the Spanning Tree cost of the path to the remote bridge. If Force DLS is set to True, indicates that the Network Cost check is not made and that the FDSE Maximum value (defined below) is used to limit the number of stations using the DLS Network. The Default value equals True.

FDSE Total

The number of Single Destination Addresses which have an FDSE with a Source equal to this Network or set of Parallel Networks.

FDSE Maximum

Indicates the maximum number of FDSE's can be created for this Network or set of Parallel Networks while it is operating as a DLS Network (i.e. has a State equal to DLS Forwarding or DLS Backup). The Default value equals the Data Link Baud Rate divided by 1000.

Section 3—DLS Design Overview

When a Bridge interfacing to more than 2 operational networks sets the Current State of one of the network's equal to Backup and the network's Parallel Networks and/or Network Validation variable equals True, it has the information necessary to determine if the network is a DLS Path. For example, in the FIG. 3-1 below, Bridge B knows all of the following:

1. Network B-C's Cost (rec Network Cost=1786)
2. its cost to the Root (rec My Cost =1786)
3. Bridge C's cost to the Root (the Hello Cost in the STP Hello message received from Backup Network B-C equals 446).

From the above information, Bridge B determines that Network B-C can be a DLS Path because B-C DLS Path Cost<B-C STP Path Cost or
Network B-C Cost<B's My Cost+B-C's Hello Cost or
1786<1786+446

If the DLS path is chosen in this fashion, all addresses of stations associated with B's Ethernet and Network B-D (i.e. addresses further away from the root) will be advertised to Bridge D as DLS Stations (i.e. addresses whose Source can be switched from the STP Path to DLS path B-C).

However, there is a way to limit Bridge B's use of DLS path B-C which also bypasses the above DLS/STP path cost comparison. If Transmit Network B-C's Force DLS equals True (the default value), Bridge B will automatically use Network B-C as a DLS path, but access to stations (advertised by Bridge C) across B-C is limited by the Transmit Network B-C variable termed FDSE Maximum (both Force DLS and FDSE Maximum are discussed in Section (2).

When Bridge B determines that Network B-C can be used as a DLS path, it notifies the Bridge C (i.e. the bridge that generated the Hello) of this fact. If Bridge C agrees then, 1. Bridge C sets Network C-B's Current State equal to DLS Forwarding
2. Bridge B sets Network B-C's Current State equal to DLS Backup.
3. Both Bridges begin advertising to the other, station addresses to be switched from the STP Path to the DLS path (i.e., Network B-C). Station Addresses are advertised in DLS frames transmitted to the other Bridge. As stated in Section 1, the set of station addresses that are advertised, are those that are positioned further away from the Root than the Bridge (i.e., Bridge B advertises stations located on its Ethernet across Network B-D and Bridge C advertises stations located on its Ethernet and across Network C-E).

While in the FIG. 3-1 configuration, Bridge C will always agree that Network B-C can be used as a DLS path, there are configurations where this is not the case. In FIG. 3-2, Configuration 1, Network A-C can not be a DLS path because Bridge A is the Root. If Network A-C is allowed to become a DLS Network, Bridge B, and possibly Bridge C, will not function properly. Bridge A will advertise all addresses as potential DLS addresses. This will result in Bridge C setting Bridge B Ethernet stations and potentially even its local Ethernet Stations as accessible across DLS path C-A.

While Bridge C in Configuration 1 could possibly recognize and prohibit the reassigning of its local Ethernet Addresses, it could not stop the reassignment of Bridge B Ethernet stations. The later results in Bridge B seeing stations change locations almost continuously.

This location change occurs in Bridge B because, when a Bridge C Ethernet station (named station x) sends a single destination frame to a Bridge B Ethernet station that has been reassigned to DLS path C-A, the frame travels across path C-A-B and Bridge B assigns Network B-A as station x's source. When station x generates a multicast frame, the frame travels across STP path C-B-A and Bridge B assigns Network B-C as station x's source. Among other things, this constant change means that FIFO can not be guaranteed for frames transmitted to station x from Bridge B's Ethernet.

Likewise, if Network A-C in Configuration 2 above is allowed to become a DLS path, the same problems occur for Bridge B. In general, a DLS path can not be formed between two bridges located along the same STP path to the Root, because any Bridges located along the same STP path between the two Bridges will observe side changes and can not guarantee FIFO.

The DLS software automatically detects the Configuration 1 and 2 cases and prevents the DLS path from forming. The Configuration 1 case is easy to detect and prevent. DLS will not allow one end of a DLS path to be connected to the STP Root Bridge. The Configuration 2 case is more challenging and requires the introduction of a new concept termed a Sector ID. This new concept is discussed below.

Sector ID's

One way of viewing Configuration 2 in FIG. 3-2 is to organize it into sectors and sub-sectors. See FIG. 3-3.

Bridge D, the Root Bridge, is placed in the center of the configuration. Each of its networks that is used as part of a STP path (i.e. not a Backup network), forms a sector. This results in Configuration 2 being divided into four sectors. Each sector is identified by the respective Transmit Network IDs (i.e. 1–4).

Bridge A is placed in the lower sector (i.e. Sector 3) which is further divided into two sub-sectors, one for each Bridge A network that is used as part of a STP path. Each of the two sub-sectors is identified by concatenating the Bridge A Transmit Network ID onto Sector ID 3. This results in the two sub-sector IDs equaling 3-1 and 3-2.

Bridge B is placed into sub-sector 3-2 which again is further divided into two sub-sectors, one for each Bridge B network that is used as part of a STP path. Each of the two sub-sectors is identified by concatenating the Bridge B Transmit Network ID onto sub-sector ID 3-2. This results in the two sub-sector IDs equaling 3-2-1 and 3-2-2. Bridge C is placed into sub-sector 3-2-2.

After all sub-sectors are created, the STP Backup network are draw (using dotted lines) between the sector/subsector containing the Bridges to which they interface. If the dotted lines are pointed to/from the Root (as it is for Network A-C in FIG. 3-3), the associated Network can not be a DLS network. Otherwise, it can.

The direction of the dotted line can be determined by analyzing the Sector ID's associated with the end-points. Network A-C's Sector IDs equal 3 and 3-2-2. Since 3 is completely contained within 3-2-2, Network A-C points to/from the Root—more about this later.

A much easier way to manually determine if the network is a DLS candidate is to draw in the STP path to the Root for the Bridges supporting a Backup Network's endpoints. If the STP path for one Bridge travels through the other, the Network is not a DLS candidate. In FIG. 3-2, Configuration 2, the STP path for Bridge C travels through Bridge A.

Maximizing DLS Potential

FIG. 3-2 illustrates one way to change the FIG. 3-2 configurations to create DLS Networks.

In both Configuration 1 and 2 above, Bridge B was reconfigured to become the Root. This allows Network A-C to become a DLS path in both configurations (i.e. in Configuration 1, Network A-C is no longer connected to the Root and in both Configuration 1 and 2, the STP path to the root for either Bridge A or Bridge C does not travel through the other).

While this change to Configuration 1 has no bad side effects, the same may not be true for Configuration 2. The entire configuration must be analyzed to insure that moving the Root to Bridge A does not cause loss of DLS paths in the Remote Sites. Also, the likelihood of role reversals in the case of Root failure has to be analyzed.

FIG. 3-4 illustrates another way to change the FIG. 3-2 configurations to create DLS paths.

In both Configuration 1 and 2 in FIG. 3-5, the Network Cost of Network A-C was reduced enough to allow Network A-C to become the STP path for Bridge C. This allows Networdk B-C to become a DLS path in both configurations (i.e. in Configuration 1, Network B-C is not connected to the Root and in both Configuration 1 and 2, the STP path to the root for either Bridge B or Bridge C does not travel through the other).

While this change to Configuration 1 may have been more difficult to determine than changing the Root Bridge, in Configuration 2 it may be justified because it avoids the potential problems associated with moving the Root.

In FIG. 3-6 the sectors and sub-sectors associated with Configuration 2 in FIG. 3-6 are illustrated. In FIG. 3-6, the Root Bridge, Bridge D, is placed in the center of the configuration and its networks that are used as part of the STP paths form sectors 1-4. Bridge A is placed in the sector 3 and Bridge B in sector 3-2. So far the illustration is the same as in FIG. 3-3. However, in FIG. 3-6, Bridge C is placed in sector 3-3 because Network A-C is now part of Bridge C's STP path.

In FIG. 3-6 Backup Network B-C is drawn (the dotted line) between the sectors 3-2 and 3-3. Since the dotted line is not pointed to/from the Root (as it is for Network A-C in FIG. 3-3), Network B-C can be used as a DLS path.

As in FIG. 3-3, the direction of the dotted line for Network B-C can be determined by analyzing the Sector ID's associated with the end-points. Network B-C's Sector IDs equal 3-2 and 3-3. Since neither is completely contained within the other, Network B-C does not point to/from the Root.

Tandem DLS Paths

As mentioned in Section 1, DLS Paths can be concatenated together in tandem. FIG. 3-7 illustrates that the FIG. 3-1 configuration contains a second DLS path, Network C-G.

Once DLS paths B-C and C-G are operational, Tandem network path B-C-G will be discovered by Bridge B and Bridge G. This means that both Bridges can use DLS paths to communicate with both
1. stations located further away from the Root than Bridge C (i.e., stations located on Bridge C's Ethernet and across Network C-E);
2. stations located further away from the Root than the other Bridge (i.e., for Bridge B, stations located on Bridge G's Ethernet and for Bridge G stations located on Bridge B's Ethernet and across Network B-D).

FIG. 3-8 illustrates TransLAN view of the FIG. 3-7. TransLAN sees three separate DLS paths, path B-C, path C-G and path B-C-G. Tandem DLS path B-C-G is evaluated just like path B-C and C-G. For example, if Force DLS is not equal to True for Network B-C in Bridge B or Network G-C in G above, the Network Cost of DLS path B-C-G is compared against the STP cost of path B-A-G. If the Network Cost of B-C-G is not less, B-C-G is not used as a DLS path.

Also, for example, the Sector IDs of path B-C-G endpoint Bridges are analyzed. As illustrated, since Bridge B has a Sector ID of 4 and Bridge G a Sector ID of 2, path B-C-G is a valid DLS path (i.e. B's STP path to the Root does not intersect G, or vice versa).

FIG. 3-9 below illustrates how the FIG. 3-8 configuration can be expanded by adding one site and two Networks. The addition of Bridge H, Network B-H and E-H results in E-H becoming a DLS path (Sector ID 3-2 is not contained in 4-3 or vice versa).

Remember, however, DLS path E-H is used only for communication between stations on H's and E's Ethernet. For example, Bridge C Ethernet Stations can not use STP path C-E and DLS path E-H to communicate with H's Ethernet stations. They must communicate with H's Ethernet stations either across STP path C-A-B-H or across DLS path C-B and STP path B-H.

As stated earlier, once the DLS paths are discovered, the endpoint bridges begin to periodically advertise stations addresses that can be switched to the DLS Networks. Only a few addresses are advertised at a time and are advertised in the DLS frames. The DLS frames also contain the STP Network Cost of the DLS path.

For example, in FIG. 3:9, Bridge B transmits a DLS frame across Network B-C once every DLS Interval. The frame contains a few addresses of stations located on B's Ethernet or across Network B-D and the Network Cost of Network B-C. Bridge C both processes the the DLS frame and forwards it across Network C-G to Bridge G for processing. The Network Cost in the forwarded frame is incremented by Network C-G's Network Cost. This DLS frame generation, processing, and forwarding allows both Bridge C and G to receive the necessary information from Bridge B to switch addresses from their STP paths to DLS path C-B and G-C-B, respectively. The switching of these addresses is discusssed next.

Switching Addresses to/from DLS Paths

FIG. 3-10 assigns for convenience stations 0-9 to Bridge G's Ethernet, stations 10-19 to Bridge C's Ethernet, stations 20-29 to Bridge E's Ethernet, stations 30-39 to Bridge H's Ethernet, and stations 40-49 to Bridge B's Ethernet.

Initially, all remote communication between Ethernet stations 0-9 and all other stations and stations 10-29 and 30-49 is tandem switched through Bridge A, the Root bridte (e.g. this communication uses the STP paths). As discussed above, once the DLS paths are discovered (i.e. B-C, C-G, B-C-G, and E-H), the Bridges supporting the DLS path endpoints begin advertising stations addresses to be switched.

When Bridge C advertises to Bridge B that station 10 can be switched to DLS paht B-C, bridge B determines if the switch can be made. Normally, if Bridge B has set Network B-C's Current State equal DLS Forwarding or DLS Backup and B-C's FDSE Maximum does not equal FDSE Total (assuming B-C's Force DLS=True) the switch is made.

However, if Bridge B were to immediately switch 10's FDSE Source Network to B-C, FIFO could be lost. Frames destined for 10 could be traveling aross STP path B-A-C while a later frame destined for 10 could take the B-C path and reach station 10 first.

First the Source Network in 10's FDSE is set equal to Network B-C. If Bridge B's FIFO Required equals False, processing is complete. Otherwise, the potential loss of FIFO is avoided by Bridge B by also setting Do Not Forward equal to True in 10's FDSE. Then if Bridge B's Transmit Flush Frame equals True, Bridge B then generates a Flush frame addressed to Bridge C and sends it across the STP path through the Root to Bridge C (i.e. path B-A-C); Bridge C then sends it back to B along DLS path C-B. When the Flush frame is received by the Bridge B, it sets Do Not Forward equal to False in 10's FDSE.

The elapsed time while the Flush frame is on its round trip journey should normally be 1-2 seconds with a worst case time for the configuration equaling DLS Round Trip Delay. Communication to station 10 from B's Ethernet and Network B-D and B-H is temporarily halted while the Flush Frame is on its round trip journey. If the Flush frame is lost or Transmit Flush Frame equals False, Bridge B sets Do Not Forward back to False in 10's FDSE after waiting for a time period equal to DLS Round Trip Delay.

In summary, when multiple addresses are advertised by Bridge C and switched at the same time by Bridge B, a single Flush frame is generated by B and remains intact throughout its round trip journey. This may not be the case when multiple addresses are advertised by E. and switched by Bridge H (assuming both FIFO Required and Transmit Flush Frame equals True in H).

In the later case, the challenge is to insure that an address's path is really flushed before setting Do Not Forward equal to True in its FDSE. To insure this occurs, Bridge H starts the round trip generating a Flush frame addressed to Bridge B (i.e. not E) and sending it down Network H-B. However, unlike B's case above, the frame can not be sent directly across the STP path through the Root to E (i.e. path H-B-A-C-E) because Bridge B supports a DLS path and is located between Bridge H and the Root. Consequently, Bridge H addresses the Flush frame to the Next DLS Bridge along the Inlink path to the Root.

When Bridge B receives H's Flush frame, it examines its addresses. If any of the Flush addresses match an FDSE with a Source Network equal to DLS Network, B-C (termed DLS addresses), the original Flush frame must be split into two frames, one containing the DLS addresses and one the non-DLS addresses. The Flush frame with the DLS addresses is sent to across the DLS path to Bridge C, the next DLS Bridge along the DLS path. Because there is no Next DLS Bridge between Bridge B and the STP path to the Root, the Flush frame with the non-DLS addresses is sent directly to Bridge E across path B-A-C-E.

When Bridge C processes the Flush frame with the DLS addresses, it sends it to Bridge E across Network C-E. This is done because Bridge E is further away from the Root than Bridge C and E's STP path to the Root passes through C.

When Bridge E receives either the Flush frames with the DLS or non-DLS addresses, it sends it directly to Bridge H across Network E-H. When either of the Flush frames are received by Bridge H, it sets Do Not Forward equal to False in the FDSE(s) whose addresses are associated with the Flush frame.

If stations 30-39 and 20-29 could utilize even more STP/DLS paths for communciation, potentially the Flush frame would be split even further in the same fashion. In fact, if there are enough utilized paths, the splitting could continue until each Flush frame contains only one address. Of course, even if there are enough utilized paths, it is very likely that this level of splitting will be required for a given set of addresses.

The same sequence of events occur when due to aging an FDSE is switched back to a STP path. First the Source Network in the FDSE is set equal to network associated with the STP path. If FIFO Required equals False, processing is complete. Otherwise, the potential loss of FIFO is avoided by setting Do Not Forward equal to True in the FDSE. and, if Transmit Flush Frame equals True, transmitting a Flush frame. Then, when the Flush frame is received or the DLS Round Trip Delay interval expires, Do Not Forward is set back to False in the FDSE.

Forwarding of Frames to/from DLS Paths

Once Bridge C in FIG. 3-10 switches station addresses 40-49 to DLS path C-B, if a single destination frame is received from C's Ethernet, Network C-E or C-G and is destined to station 40, it will be forwarded to Network C-B. If a frame is received from Network C-A, the Inlink, and is destined to 40, it is not forwarded.

The frame received from Network C-A is discarded, because it will only be received across C-A as long as Bridge A views 40 as a unknown single destination (or 40 moves or STP changes the configuration, both of these conditions are discussed later). In addition, as long as Bridge A has this unknown single destination perspective, there is a duplicate frame that reaches 40 using a STP path (e.g. Bridge A will also transmit a copy on Network A-B, if the frame is received from A's Ethernet, Network A-F, or A-G). When 40 becomes a known single destination to Bridge A, Bridge C will no longer receive these frames on Network C-A (i.e. Bridge A will know to only forward frames destined to 40 to Network A-B and not also to A-C).

Also, relative to receiving frames from Network C-B, Bridge C only forwards known signle destination frames. One should note that these frames are only forwarded by Bridge C to its Ethernet, Network C-E, or C-G. This is because the only addresses advertised as DLS candidates to Bridge B are those which lie in these directions. Bridge C discards unknown single destination frames received from Network C-B.

As implied above, multicast destination frames are not transmitted on DLS paths. They are only transmitted across STP paths.

DLS FDSE Aging

As discussed above, assigning DLS Source Networks to FDSEs (termed DLS FDSEs) is done differently than assigning non-DLS Source Networks to FDSEs. FDSE are initially assigned to DLS paths based upon address information advertised within DLS frames, not based upon source addresses in received frames. Also, A Source Network value is not changed in a DLS FDSE when the matching Source Adresses value is received from an STP path (e.g., from a multicast frame).

This change in learning also impacts the Aging of DLS FDSEs. This impact must be handled carefully because FDSE Aging is the mechanism used to handle station movement and STP path changes (when STP activates a new STP path, Short Aging Timers are run in all Bridges, expediting the aging off of FDSEs associated with inactive addresses).

In Bridge B, FIG 3-10, when Short Aging Timers are not running, the Aging value in one of its DLS FDSE's, for example 10's FDSE, can be set to Young by two events. It is set to Young when the address value of 10 is received from Network B-C in either a frame's source address or as a value within Bridge C's DLS frame. When Short Aging Timers are running, the Aging value in 10's FDSE is only set to Young when the address value of 10 is received from Network B-C in a frame's source address. Independent of Short Aging Timers, 10's FDSE Aging value is not impacted by frames received from other than Network B-C.

DLS Interaction with STP

In FIG. 3-10, if Bridge G's Inlink (i.e., Network G-A) fails, G sets Network G-A's Current State equal to Broken. From this point on the processing in both Bridge G and C is dependent upon the value of Network G-C's Current State. Note that if Network G-C's Current State in Bridge G equals DLS Backup, Network C-G's Current State in Bridge C equals DLS Forwarding and vice versa.

If Network G-C's Current State equals DLS Backup, Bridge G determines instantly that G-C is its new Inlink. As a result, Bridge G sets Network G-C's Current State equal to Pre-Forwarding 2 and stops generating any DLS frames across Network G-C. In about more 10 seconds (Pre-Forwarding Delay÷2), Bridge G changes Network G-C Current State to Forwarding and starts the running of Short Timers throughout the configuration. In about 10 more seconds (5 times the DLS Interval-Preforwarding Delay÷2), the absence of DLS frames causes Bridge C to change Network C-G's Current State from DLS Forwarding to Forwarding. Network G-C is now a fully operational STP path.

If Network G-C's Current State equals DLS Forwarding, Bridge G temporarily assumes it is the Root, sets Network G-C's Current State equal to Forwarding, stops generating DLS frames, and begins to Transmit STP Hello frames on its Ethernet and Network G-C. As a result, in about 20 seconds (i.e. Bridge C's Pre-Forwarding Delay), Bridge C, relative to Network C-G, sets Current State equal to Pre-Forwarding 2, stops transmitting DLS frames, and starts transmitting STP Hello frames. Receipt of this Hello frame causes Bridge G, to determine instantly that Network G-C is the new Inlink. In about more 10 seconds, Bridge C changes Network C-G Current State to Forwarding and starts the running of STP Short Timers throughout the configuration to age off outdated FDSEs. Network G-C is now a fully operational STP path.

In either of the above cases, the absence of any DLS frames from Bridge G also causes Bridge B to stop using DLS path B-C-G and the running of Short Timers in Bridge B causes it to age off stations 0-9 if the are idle. However, Bridge B will continue to use DLS path B-C for communication with 0-9. This is because as long as Network A-G is failed, Bridge C advertises addresses 0-9 in its DLS frames transmitted on Network C-B (i.e., 0-9 are further away from the Root than C).

When Network A-G restores, the configuration returns to its original condition. Network G-A becomes Bridge G's Inlink, STP Short Timers are run throughout the configuration, and Network G-C initially becomes a STP Backup path. DLS path C-G and B-C-G are then rediscovered.

The results of other failure/restorals in FIG. 3-10 are the same. In the case of failure, it takes the same amount of time to convert a DLS path to a STP path as it does to convert a STP Backup path to a STP path. In the case of restorals first STP paths and Backup paths are reestablished and then the DLS paths are reestablished.

DLS Extension

FIG. 3-11 contains an example of how the FIG. 3-10 configuration could be modified to require the DLS Extension feature.

In FIG. 3-11, Bridges G' and H' have been added and interface directly to the DLS paths and have Ethernet Inlinks. The DLS Extension feature is invoked by setting Enable DLS equal true for the Bridge G and H Ethernet Transmit Network (G and H are the DB's for their respective Ethernets). Of course, Enable DLS must also be set to true for the DLS path Transmit Networks in both Bridge G' and H'. If this done, all of the DLS capabilities associated with the configuration in FIG. 3-10 now apply to the configuration in FIG. 3-11.

In FIG. 3-11 Bridge H generates the DLS frames instead of H' and transmits them on its local LAN. The addresses in the DLS frames are adresses H believes are on its local LAN. Bridge H' receives the DLS frames, deletes any addresses its knows are not on the local LAN and forwards the DLS frames onto Bridge E. Bridge E processes the DLS frames as described earlier. Likewise, Bridge H' processes E's DLS frames as described earlier and then forwards them on to H. H marks the FDSEs associated with all the addresses received in DLS frames as "do not forward".

While I have illustrated and described the preferred embodiments of my invention, it is to be understood that these are capable of variation and modification, and I therefore do not wish to be limited to the precise details set forther, but desire to avail myself of such changes and alterations as fall within the purview of the following claims.

I claim:

1. A method of exchanging frames between bridges to distribute load sharing in a communications network of the kind in which bridges, and related stations in local LANs can be linked by paths in a plurality of sub-networks and wherein the bridges are linked to support a Spanning Tree Protocol, STP, which elects one bridge as a root and then, with respect to said root, computes and utilizes one and only one loop free set of primary paths between all bridges, said method comprising, examining remaining paths other than said STP primary paths, between the bridges as possible subnetwork paths for a Distributed Load Sharing, DLS, configuration in which frames exchanged between certain stations can utilize more than said STP one set of primary paths between the stations, selecting certain ones of the remaining paths as DLS paths only when
- (a) the two bridges interfacing to the DLS path also interface to one or more other sub-networks and neither is the STP root bridge, and routing over a selected DLS path only those frames
- (a) which have a known single destination, and
- (b) which are frames to be transferred between stations (1) which are further away from the root than either bridge associated with said stations or (2) which lie on the bridge's local LAN.

2. The invention defined in claim 1 including configuring the bridges at the ends of a DLS path to know which stations are farther away from said root so that frames are not transferred between stations whose source network is an STP inlink on either bridge unless the STP inlink on either bridge is the local LAN.

3. The invention defined in claim 1 including switching station addresses between an STP path and selected DLS paths and preserving first-in first-out, FIFO, frame exchange while switching said station addresses.

4. The invention defined in claim 1 including supporting tandem DLS paths made up of shorter DLS paths.

5. The invention defined in claim 1 wherein each DLS path bridge is a self learning bridge.

6. The invention defined in claim 5 including configuring self learning bridges on a potential DLS path (a) to recognize when said bridges are on a potential DLS path, (b) to let the related bridge on the DLS path know of said recognition, (c) to decide whether the related bridge is on the DLS path, (d) to agree with the related bridge to form the DLS path, (e) to advertise to the related bridge which stations are appropriate to use the DLS path, (f) to flush the STP path with a flush packet prior to switching stations over to start using the DLS path to thereby preserve first-in first-out, FIFO, frame exchange between stations, then (g) to start switching stations over to using the DLS path.

7. The invention defined in claim 5 including configuring self learning bridges on a potential DLS path (a) to recognize when said bridges are on a potential DLS path, (b) to let the related bridge on the DLS path know of said recognition, (c) to decide whether the related bridge is on the DLS path, (d) to agree with the related bridge to form the the DLS path, (e) to advertise to the related bridge which stations are appropriate to use the DLS path,
- (f) to start switching stations over to using the DLS path, then (g) to flush the STP path with a flush packet prior to switching stations over to start using the DLS path to thereby preserve first-in first-out, FIFO, frame exchange between stations.

8. The invention defined in claim 5 wherein each bridge on a DLS path has either (1) a first port for association with an STP path pointing to said root, at least a second port for association with an STP path pointing away from said root, and a third port for association with the DLS path or (2) a first port for association with an STP path pointing to said root and only a second port for association with the DLS path.

9. The invention defined in claim 5 including configuring the bridges to remain compatible with STP while establishing a DLS path.

10. The invention defined in claim 1 including configuring the data stores for each of the sub-networks for operation with STP and DLS paths.

11. Apparatus for exchanging frames between bridges to distribute load sharing in a communications network of the kind in which bridges, and related stations in local LANs can be linked by paths in a plurality of sub-networks and wherein the bridges are linked to support a Spanning Tree Protocol, STP, which elects one bridge as a root and then, with respect to said root, computers and utilizes one and only one loop free set of primary paths between all bridges, said apparatus comprising,
  self learning bridge means for examining remaining paths, i.e. paths other than said STP primary paths, between the bridges as possible sub-network paths for a Distributed Load Sharing, DLS, configuration in which frames exchanged between certain stations can utilize more than said STP one set of primary paths between the stations,
  said self learning bridge means also including DLS path selecting means for selecting certain ones of the remaining paths as DLS paths only when
  - (a) the two bridges interfacing to the DLS path also interface to one or more other sub-networks and neither is the STP root bridge, and for routing over a selected DLS path only those frames
  - (a) which have a known single destination, and
  - (b) which are frames to be transferred between stations (1) which are further away from the root than either bridge associated with said stations or (2) which lie on the bridge's local LAN.

12. The invention defined in claim 11 wherein said self learning bridge means include bridges having either (1) a first port for association with an STP path pointing to said root, at least a second port for association with an STP path pointing away from said root, and a third port for association with the DLS path or (2) a first port for association with an STP port pointing to said root and only a second port for association with the DLS path.

13. The invention defined in claim 11 wherein the self learning bridge means include configuration means for configuring the bridges at the ends of a DLS path to know which stations are farther away from said root so that frames are not transferred between stations whose source network is an STP inlink on either bridge unless the STP inlink on either bridge is the local LAN.

14. The invention defined in claim 13 wherein the configuration means configure the bridges to remain compatible with STP while establishing a DLS path.

15. The invention defined in claim 13 wherein the configuration means configure the data stores for each of the sub-networks for operation with STP and DLS paths.

16. The invention defined in claim 11 wherein the self learning bridge means include cost determining means for optionally using cost information learned from STP to identify which sub-networks of STP are both STP backup networks and DLS paths and for utilizing such STP backup networks as DLS paths.

17. The invention defined in claim 11 wherein the self learning bridge means include switching means for switching station addresses between an STP path and selected DLS paths and flushing means for flushing the DLS paths with a flush packet prior to switching station addresses to preserve first-in first-out, FIFO, frame exchange while switching said station addresses.

18. The invention defined in claim 11 wherein the self learning bridge means include tandem path support means for supporting tandem DLS paths made up of shorter DLS paths.

19. The invention defined in claim 13 wherein the configuration means are constructed (a) to recognize when said bridges are on a potential DLS path, (b) to let the related bridge on the DLS path know of said recognition, (c) to decide whether the related bridge is on the DLS path, (d) to agree with the related bridge to form the DLS path, (e) to advertise to the related bridge which stations are appropriate to use the DLS path, (f) to flush the STP path with a flush packet prior to switching stations over to start using the DLS path to thereby preserve first-in-first-out, FIFO, frame exchange between stations, then (g) to start switching stations over to using the DLS path.

20. The invention defined in claim 13 wherein the configuration means are constructed (a) to recognize when said bridges are on a potential DLS path, (b) to let the related bridge on the DLS path know of said recognition, (c) to decide whether the related bridge is on the DLS path, (d) to agree with the related bridge to form the DLS path, (e) to advertise to the related bridge which stations are appropriate to use the DLS path,
(f) to start switching stations over to using the DLS path, then (g) to flush the STP path with a flush packet prior to switching stations over to start using the DLS path to thereby preserve first-in first-out, FIFO, frame exchange between stations.

* * * * *

Disclaimer and Dedication 4,811,337—John H. Hart, Campbell, Calif. DISTRIBUTED LOAD SHARING. Patent dated March 7, 1989. Disclaimer and Dedication filed Dec. 24, 1997, by the assignee, Vitalink Communications Corp.

Hereby disclaims and dedicates to the public all claims of said patent.
*(Official Gazette,* February 24, 1998)